(12) United States Patent
Duer et al.

(10) Patent No.: US 10,592,405 B2
(45) Date of Patent: Mar. 17, 2020

(54) VISUALIZATION OF VULNERABILITIES DETECTED BY STATIC APPLICATION TESTING

(71) Applicant: International Business Machines Corporation, Armonk, NY (US)

(72) Inventors: Kristofer A. Duer, Manchester, NH (US); John T. Peyton, Arlington, MA (US); Stephen D. Teilhet, Milford, NH (US); Lin Tan, Waterloo (CA); Jinqiu Yang, Waterloo (CA)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 15/723,905

(22) Filed: Oct. 3, 2017

(65) Prior Publication Data
US 2019/0102286 A1    Apr. 4, 2019

(51) Int. Cl.
G06F 11/00   (2006.01)
*G06F 11/36*   (2006.01)
*G06F 21/57*   (2013.01)

(52) U.S. Cl.
CPC ...... *G06F 11/3692* (2013.01); *G06F 11/3688* (2013.01); *G06F 21/577* (2013.01); *G06F 2221/033* (2013.01)

(58) Field of Classification Search
CPC ............. G06F 11/3692; G06F 11/3688; G06F 21/577; G06F 2221/033
See application file for complete search history.

(56) References Cited

U.S. PATENT DOCUMENTS

| 8,479,171 | B2 | 7/2013 | Ghosh | |
|---|---|---|---|---|
| 8,850,405 | B2 | 9/2014 | Fink et al. | |
| 9,507,943 | B1* | 11/2016 | Allen | G06F 21/577 |
| 2006/0277539 | A1* | 12/2006 | Amarasinghe | G06F 21/53 717/168 |
| 2008/0184208 | A1* | 7/2008 | Sreedhar | G06F 21/577 717/128 |
| 2011/0126288 | A1* | 5/2011 | Schloegel | G06F 21/577 726/25 |
| 2012/0216177 | A1* | 8/2012 | Fink | G06F 8/75 717/131 |
| 2014/0123293 | A1* | 5/2014 | Tripp | G06F 21/577 726/25 |
| 2015/0106783 | A1* | 4/2015 | Mytkowicz | G06F 8/22 717/104 |
| 2016/0188885 | A1* | 6/2016 | Lee | G06F 21/577 726/25 |

(Continued)

OTHER PUBLICATIONS

Dictionary.com, Interactive (Year: 2019).*

(Continued)

*Primary Examiner* — Marc Duncan
*Assistant Examiner* — Jonathan D Gibson

(57) ABSTRACT

Vulnerability testing of applications may include one or more of identifying a number of paths from a software application being tested, identifying a number of nodes associated with the paths, determining one or more of the paths which share one or more of the nodes, designating the paths which share the nodes as overlapping paths, and displaying the overlapping paths and the shared nodes as an interactive visualization to identify to identify optimal locations to fix one or more vulnerability findings.

20 Claims, 9 Drawing Sheets

(56) References Cited

U.S. PATENT DOCUMENTS

2016/0224790 A1   8/2016  Gupta
2016/0246965 A1*  8/2016  Cornell ................ G06F 21/577
2018/0075233 A1*  3/2018  Gray ...................... G06F 21/54
2019/0102286 A1*  4/2019  Duer ................. G06F 11/3692

OTHER PUBLICATIONS

Gansner, E.R., and S.C. North, "An Open Graph Visualization System and its Applications to Software Engineering," Software—Practice and Experience, 00(S1), 1-5 (1999).

Greevy et al., "Visualizing Live Software Systems in 3D," Proc of the 2006 ACM Symp on Software Visualization, ACM, 2006.

Radwan et al., "Code Pulse: Software Assurance (SWA) Visual Analytics for Dynamic Analysis of Code," AFRL-RI-RS-TR-2014-249, Sep. 2014.

* cited by examiner

150

VISUALIZATION OF VULNERABILITIES DETECTED BY STATIC APPLICATION TESTING

TECHNICAL FIELD

This application generally relates to software vulnerability testing, and more particularly, to visualization of vulnerabilities detected by static application testing.

BACKGROUND

Static application security testing (SAST) is a way for determining whether software is vulnerable to attacks from malicious users. The underlying technology for SAST is a static analysis where the software is examined in a non-executing (static) state. The code itself and any accompanying configuration files used at runtime are examined in a variety of ways to predict whether the code, when deployed, has weaknesses that could be exploited by an attacker resulting in a vulnerability. The techniques for making predictions vary widely, but most commercial SAST tools use model checking, theorem proving, abstract interpretation, and other techniques that require tradeoffs in precision in order to arrive at practical results within a reasonable time, and space constraints on modern computing machinery.

The tradeoffs in precision, plus the complexity and size of modern applications (millions to tens of millions of lines of code), results in the end users being presented with a very large set of weaknesses. To quickly arrive at an overall sense of the weakness of an application, and to determine where to focus remediation efforts is a great challenge when the list of weaknesses (also called 'findings') numbers in the thousands, or more commonly, tens or hundreds of thousands. For a result that takes hours to produce, it can take several person days or weeks to determine what needs to be fixed and how much effort would be involved. Most weaknesses are presented as individual paths through the application, illustrating how attack data promulgates through the code until it reaches its target. Although many of these weaknesses are related by sharing portions of the path through the code, the individual listing makes it difficult to discern relationships between the weaknesses, and obtain a clear picture of where the application needs the most attention.

There are several existing commercial tools which provide such visualizations that present weaknesses and use techniques to summarize the security state of the application. These are generally summary line or bar graphs based on the weakness category (CWE), identifying how many and what kind of weakness the application currently may have. The applications do not provide an easy-to-access picture of where application code is impacted and what the current structure of the code is.

SUMMARY

One example method of operation may include identifying a plurality of paths from a software application being tested, identifying a plurality of nodes associated with the plurality of paths, determining one or more of the plurality of paths which share one or more of the plurality of nodes, designating the one or more of the plurality of paths which share the one or more of the plurality of nodes as overlapping paths, and displaying the overlapping paths and the shared nodes as an interactive visualization to identify optimal locations to fix one or more vulnerability findings.

Another example embodiment may include an apparatus that provides a processor configured to perform one or more of identify a plurality of paths from a software application being tested, identify a plurality of nodes associated with the plurality of paths, determine one or more of the plurality of paths which share one or more of the plurality of nodes, designate the one or more of the plurality of paths which share the one or more of the plurality of nodes as overlapping paths; and a display configured to display the overlapping paths and the shared nodes as an interactive visualization to identify optimal locations to fix one or more vulnerability findings.

Still another example embodiment may include a non-transitory computer readable storage medium configured to store instructions that when executed cause a processor to perform identifying a plurality of paths from a software application being tested, identifying a plurality of nodes associated with the plurality of paths, determining one or more of the plurality of paths which share one or more of the plurality of nodes, designating the one or more of the plurality of paths which share the one or more of the plurality of nodes as overlapping paths, and displaying the overlapping paths and the shared nodes as an interactive visualization to identify optimal locations to fix one or more vulnerability findings.

Another example method of operation may include one or more of testing, via a device, a software application while the application is being executed, identifying, via the device, a plurality of paths from the software application being tested, identifying, via the device, a plurality of nodes associated with the plurality of paths, determining, via the device, one or more of the plurality of paths which share one or more of the plurality of nodes, designating, via the device, the one or more of the plurality of paths which share the one or more of the plurality of nodes as overlapping paths, and displaying, via a display, the overlapping paths and the shared nodes as an interactive visualization to identify optimal locations to fix one or more vulnerability findings.

Another example embodiment may include an apparatus that provides a processor configured to perform one or more of test a software application while the application is being executed, identify a plurality of paths from the software application being tested, identify a plurality of nodes associated with the plurality of paths, determine one or more of the plurality of paths which share one or more of the plurality of nodes, designate the one or more of the plurality of paths which share the one or more of the plurality of nodes as overlapping paths, and a display configured to display the overlapping paths and the shared nodes as an interactive visualization to identify optimal locations to fix one or more vulnerability findings.

Still another example embodiment may include a non-transitory computer readable storage medium configured to store instructions that when executed cause a processor to perform testing, via a device, a software application while the application is being executed, identifying, via the device, a plurality of paths from the software application being tested, identifying a plurality of nodes associated with the plurality of paths, determining one or more of the plurality of paths which share one or more of the plurality of nodes, designating the one or more of the plurality of paths which share the one or more of the plurality of nodes as overlapping paths, and displaying the overlapping paths and the shared nodes as an interactive visualization to identify optimal locations to fix one or more vulnerability findings.

DETAILED DESCRIPTION

Figure 1A:
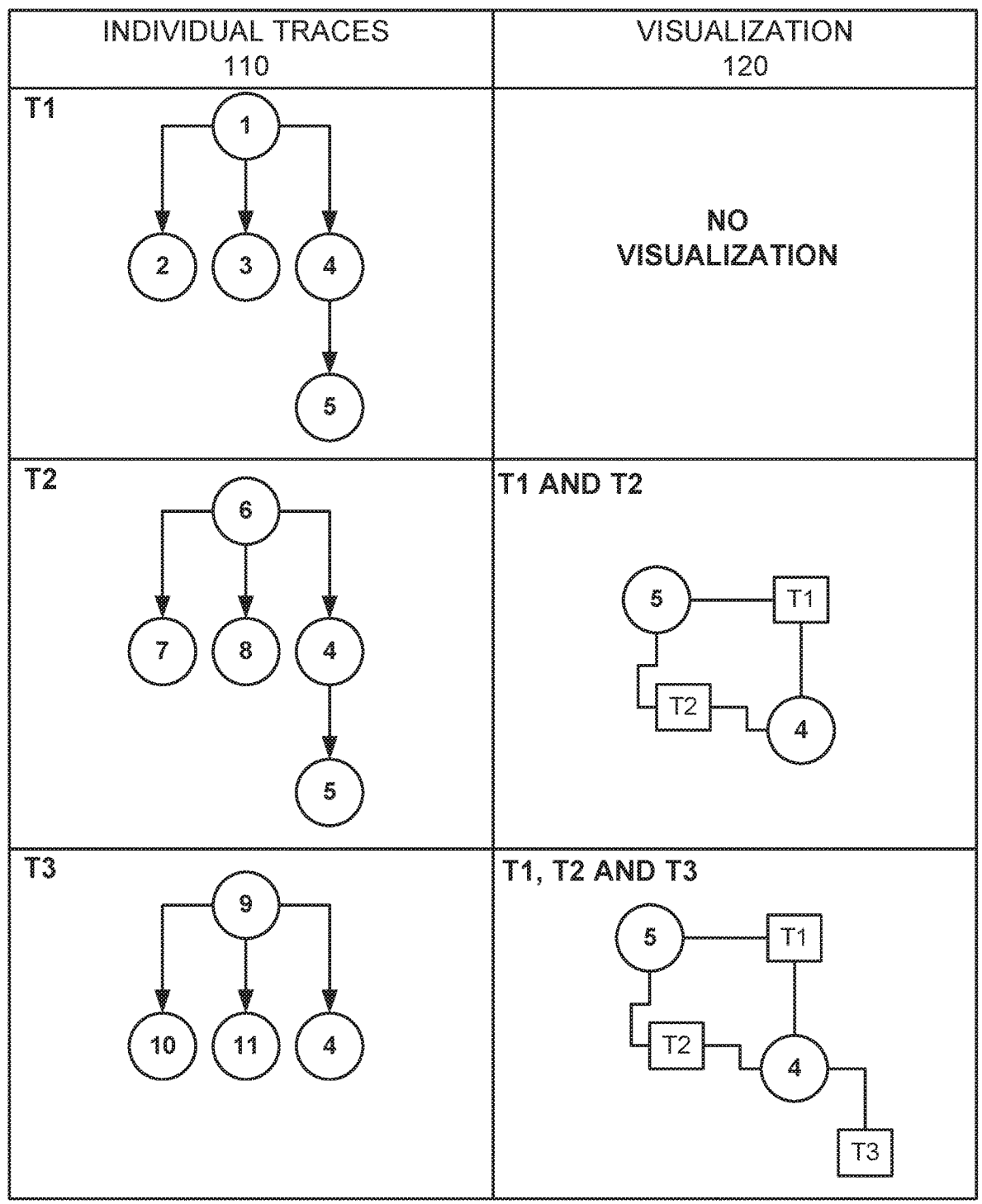
FIG. 1A illustrates individual traces and a corresponding overall visualization according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to software vulnerability testing and in another embodiment relates to visualizing portions of software code which are detected to be likely candidates for security threats.

Example embodiments include obtaining a plurality of paths from static application security testing. In one example, each path includes a plurality of nodes, and each path indicates a potential code weakness. This example may also include determining which paths share nodes, resulting in overlapping paths. Also, the example provides determining which nodes are shared by the overlapping paths, resulting in shared nodes. The result includes visually depicting a plurality of potential code weaknesses in a manner that associates the overlapping paths and the shared nodes resulting in a visual depiction which may be further analyzed to identify vulnerabilities. Additionally, the visual depiction may include a bipartite graph that clusters the overlapping paths and the visual depiction may be interactive.

In general, the circles in the drawings represent 'trace nodes'. The 'trace nodes' are locations in the source code. The boxes represent 'findings' and a 'finding' is a set of 'trace nodes'. The set of trace nodes represents a sequence of source code statements that are executed, in order, at runtime to create a vulnerability. A 'finding' is a trace through the source code that creates a vulnerability in the application. The term 'trace node' is used to represent each of the locations in the sequence. The different findings can share trace nodes, and the sequences for two findings may have some shared subsequences. The term 'node' is not directly related to a certain number of lines of code, but instead is related to a certain operation in the program's execution. In particular, one example may be an operation that transfers untrusted data from one memory location to another. In the source code location this could be expressed in a single line or multiple lines, and inversely, multiple operations (or nodes) could occur on the same line. In addition to line-to-node mapping, a 'grouping' may be performed to congregate many lines of code into a single node, as there can be, and generally are, thousands of nodes in the findings. A core aspect of the visualization is to reduce this complexity by illustrating only those nodes that are shared by two or more findings. This is most apparent in FIG. 1A in which the total number of nodes is 11, but only 2 are in the visualization.

The resulting visualization is a bipartite graph that relates paths (i.e., weaknesses/findings) and a subset of the shared nodes between those paths. The visualization is scalable and illustrates groupings of traces related by common paths or common weakness types. This visualization presents a whole picture of all vulnerability findings from projects. Specifically, the visualization can present hundreds or thousands of findings in one illustration. Vulnerability findings may be clustered together since they have common trace nodes either directly or indirectly. The findings enable developers/users to have a global view of all vulnerability findings so that they can prioritize working on some clusters (i.e., groups of vulnerability findings) over others. A bipartite graph is a graph of nodes and edges in which the nodes are divided into two disjoint subsets, and there are no edges between the two nodes in the same subset. Another way to say it is that all edges go from a node in one subset to a node in the other subset. In this example, the two disjoint subsets are 'findings' (vulnerabilities) and 'trace nodes'. The edges represent the 'belongs to' relation, in that an edge from a 'trace node' to a 'finding' means the 'trace node' belongs to the set of trace nodes associated with the finding. Alternately, in the other direction, it could be described as a 'contains' relation, in that an edge from a 'finding' to a 'trace node' means the set of 'trace nodes' associated with the 'finding' contains that 'trace node'. As part of the bipartite nature of the graph, a 'trace node' could never 'belong to' another 'trace node' and a 'finding' could never 'contain' another 'finding'. The visualization is generated from real applications. Specifically, in one example 'APPLICATION 'A'' is used to assist with the visualization. The visualization may be created from findings of SAST scans. The findings extract from the SAST scans may be used as input to output the visualization including the findings and the shared trace nodes. In one example, the overall visualization is built by using findings from the SAST scans. An 'overlapping path' indicates that the path shares at least one node with another path. A 'trace' is a synonym for 'path' both by itself and as part of 'trace node', for example, 'trace node' and 'path node' have the same meanings.

FIG. 1A illustrates traces of three different findings 100 according to example embodiments. Referring to FIG. 1A, the column 'Individual Traces' 110, is from SAST scans. The column 'Resulting Visualization' 120 illustrates the corresponding overall visualizations. Trace 1 (T1), T2 and T3 represent tree structures of each finding's trace. Every node in the traces have a number for identification purposes. For instance, T1 contains nodes 1, 2, 3, 4, and 5. Among the three traces T1, T2 and T3, one common node for all three traces is node 4. The overall visualization for T1 and T2 may be illustrated, as shown in the second column and second row, includes both trace nodes T1 and T2 and their shared trace nodes including node 4 and 5. Similarly, the overall visualization for T1, T2 and T3, is provided in the third row, second column and includes three traces and two shared nodes. Also, node 4 is shared by three traces including T1, T2 and T3, and node 5 is shared by two traces including T1 and T2. FIG. 1A illustrates the reduction in size and complexity of the visualization that is achieved by using the bipartite graph and removing duplication of the nodes.

This 'visualization' presents a whole picture of all vulnerability findings from a project. Vulnerability findings are clustered together because they have common trace nodes either directly or indirectly, which enables developers/users to have a global view of all vulnerability findings so that they can prioritize working on certain clusters (i.e., groups of vulnerability findings) over others. The visualization may be a graph of nodes and edges. For example, FIG. 1C is a subgraph of the visualization of a 'APPLICATION 'A'' project. There are two types of nodes: vulnerability findings (rectangles) and trace nodes (circles). In certain preferred embodiments, edges only link one vulnerability finding and one trace node, but not two vulnerability findings or trace nodes. One edge between one vulnerability finding and one trace node demonstrates that the trace node is in the trace of the vulnerability finding. We define each disjoint graph as a 'D-cluster', e.g., there are three D-clusters in the example subgraph of FIG. 1C, one vulnerability on the leftmost cluster, seven in the middle cluster, and one on the rightmost cluster. In addition to a 'D-cluster', a 'cluster' is a group of vulnerability findings which share the same fix location. In general, the approach is to have one visualization for a single application. Vulnerability findings are reported per application, that is, findings are associated with a single application. Theoretically and practically, in some cases, two applications can share some of their code, that is, portions of code in one application is the same code as that in another application. In that case, a single visualization could be used for multiple applications. This approach could be useful when multiple applications could be fixed by a single code change. Any of the one or more applications can be executed on one or more computing systems (including components, devices, or modules which may include software, hardware or a combination of both) with one or more machines processing the application data. The application data is identified, executed, and, the vulnerabilities are identified and translated to a visualization model which is stored in memory along with any other data used to provide the users with auditable data and direct or indirect feedback.

Figure 1B:
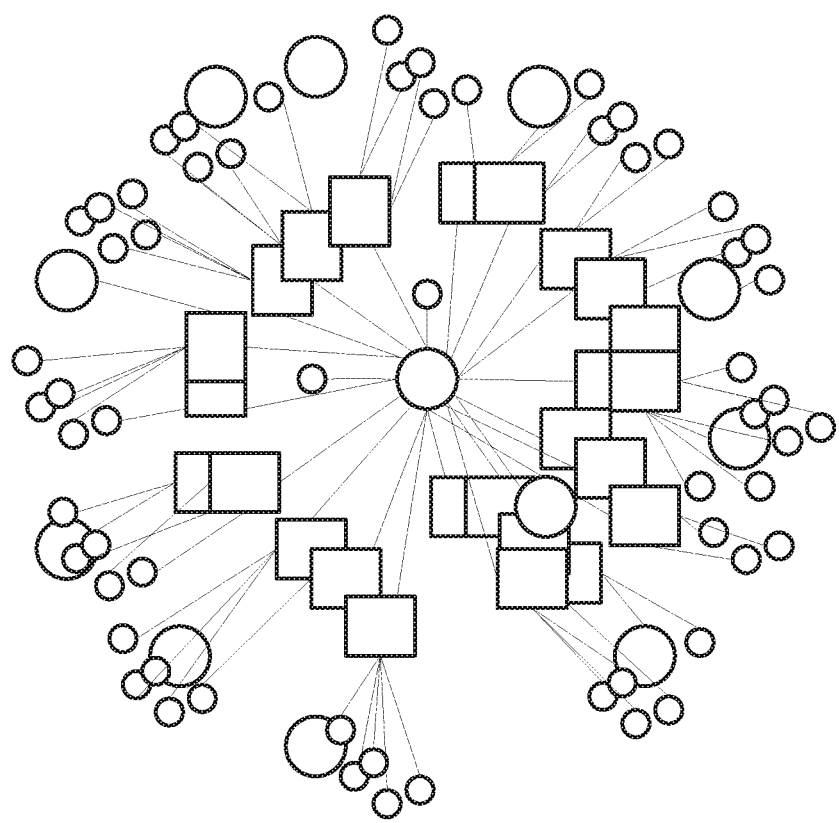
FIG. 1B illustrates an example of one cluster grouped by a fix location suggestion in the center according to example embodiments.
Figure 1B:
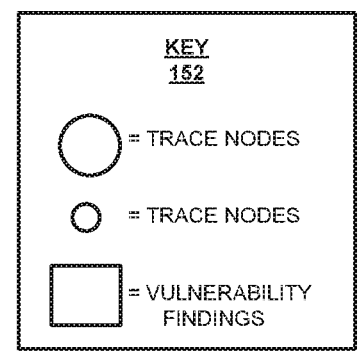
Figure 1C:
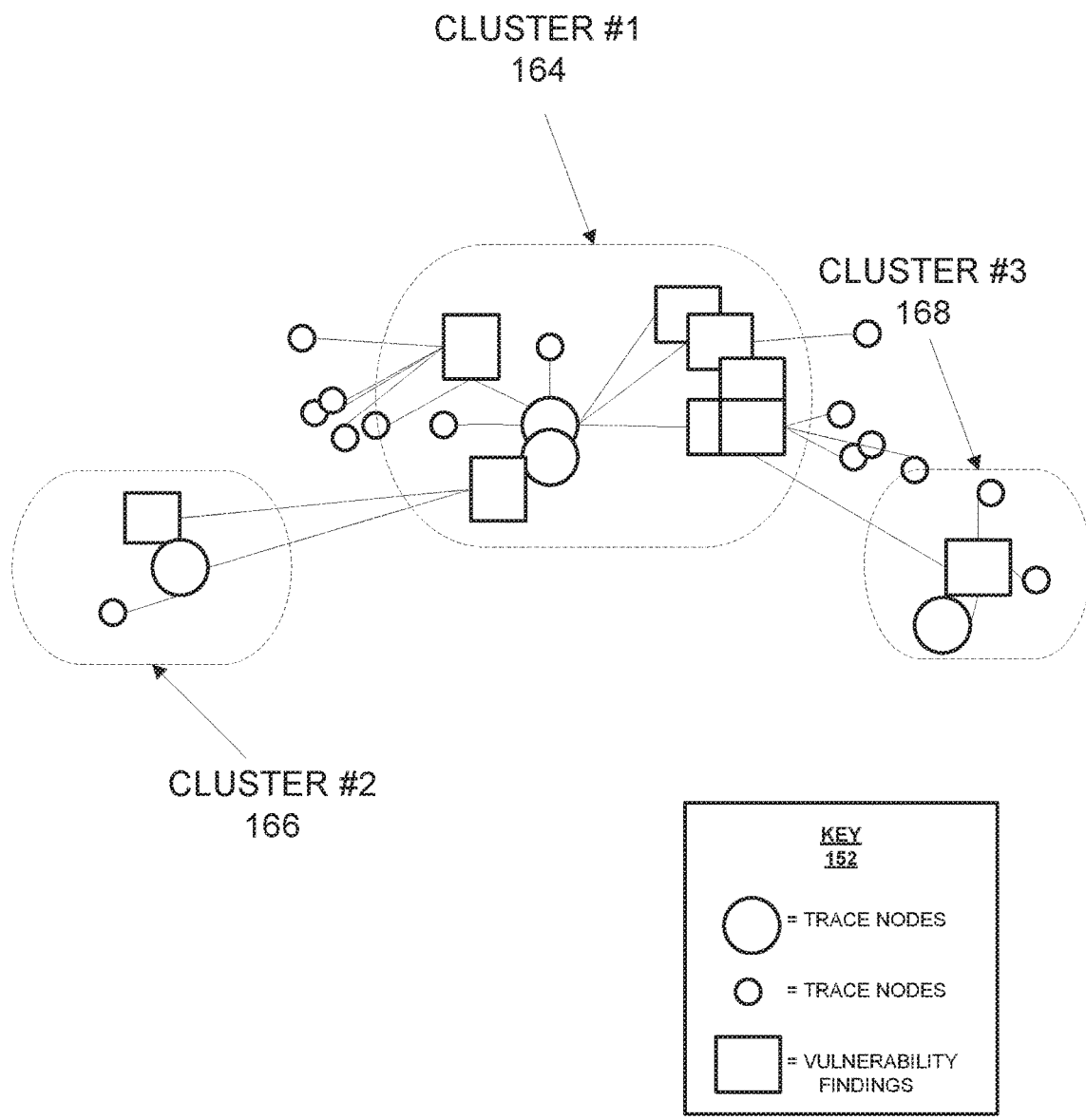
FIG. 1C illustrates an example of three D-clusters according to example embodiments.

FIG. 1B illustrates another example illustration according to example embodiments. Referring to FIG. 1B, a compact illustration of trace nodes and vulnerability findings 150 is provided. In this example, one cluster includes 25 vulnerability findings (i.e., 25 boxes) grouped by a fixed location suggestion in the center. The visualization is a graph of nodes and edges. For example, there are two types of nodes as indicated by the key 152, one is a vulnerability finding (rectangle) and the other are trace nodes (circle). In addition, different sizes and colors may be used to represent different types of trace nodes and different vulnerability types. For example, one color of rectangle nodes may be used to represent cross-site scripting (CSS) vulnerabilities. Edges only link one vulnerability finding and one trace node, but not two vulnerability findings or trace nodes. One edge between one vulnerability finding and one trace node indicates that the trace node is in the trace of the vulnerability finding. This example in FIG. 1B is one example of a 'cluster'. All the surrounding vulnerability findings have the same recommended fix location. The visualization is an interactive graph. When developers/users move the cursor to one node, the corresponding information, such as vulnerability type, file name, etc. will show in a text box nearby (not shown). In addition, other nodes and edges linked to this node will be highlighted. In order to rectify the situation, example embodiments may include an automated procedure which performs one or more of removing, nullifying, and modifying the optimal locations to fix the one or more vulnerability findings. Removing may be defined as deleting that portion of code, nullifying may be a way to maintain the code while removing its active status (i.e., converting code to comments via symbols and nullifying parameters, such as double back-slashes). Another option may include performing a known modification or fix, for example, a class or method that is known to be faulty may be swapped-out or changed to a particular fix action that is known and stored in memory and used when such code is identified.

In general, the circles in FIG. 1B represent 'trace nodes'. The 'trace nodes' are locations in the source code. In certain preferred embodiments, the large circles in the visualization represent a 'fix location suggestion' as the large circles represent a location in the source code shared by multiple findings. By fixing code in this particular location, all the findings connected to this circle could be fixed as well. It is only a 'suggestion' since if the set of findings (squares) connected to the circle are illustrated with different patterns/colors (i.e., representing different vulnerability types), then a user may select points in the code other than the suggestion in order to make separate fixes for the different vulnerability types. The large circles would be referred to as an 'optimum fix location suggestion' since it represents the location that, if changed, would fix/repair the most number of findings/vulnerabilities which would be 'optimum' since it would be the most fixes with the least effort.

The boxes are vulnerability findings. If the boxes are different colors or patterns, then they represent different vulnerability types. For example, one color might represent a cross-site scripting vulnerability, another color might represent a SQL injection vulnerability, and a third color may represent a buffer overflow vulnerability. The large circles may be colored differently to represent a 'fix location suggestion' which are not optimal. They are only connected to a proper subset of the findings in their cluster. By selecting to fix the code at this location, a developer would not fix all the findings in the cluster as multiple code changes would be required to fix all the findings rather than one code change. A large circle in the center may be lightly colored to represent a special case of the other circles which may be colored differently. This may be a trace node that is shared by all the findings in the cluster and is the source code location that is deemed to be the best place to fix the source code. The small circles represent individual trace nodes that are not a fix location suggestion. For any given finding, some of the trace nodes in a set are considered suitable as fix locations, others are not suitable fix locations. The small circles are generally not suitable fix locations.

FIG. 1C illustrates an example of multiple D-clusters 160 from another visualization according to example embodiments. Each disjoint graph portion may be denoted as a D-cluster (e.g., three D-clusters 164, 166 and 168), one D-cluster 164 has seven vulnerability findings in the center (7 boxes) and the other two D-clusters 166 and 168 each have one vulnerability finding, including one on the right in cluster 168 and one on the left in cluster 166. The cluster may be defined as a group of vulnerability findings which share the same fix location. A D-cluster provides that all the nodes in the cluster do not link to any other nodes. All the surrounding vulnerability findings have the same recommended fix location or center node. Each node in one D-cluster does not link to any other nodes in other D-clusters. Vulnerability findings in different D-clusters do not have any trace nodes in common. Therefore, those vulnerability findings have different fix locations. Vulnerability findings in the same D-cluster do not necessarily share the same fix location. In fact, each D-cluster may contain several regular clusters. Collisions occur when one fix location is shared by two clusters.

The visualization may be an interactive graph. When developers/users move the cursor to one node, the corresponding information may include a 'vulnerability type', 'file name', etc., will be displayed in a text box nearby the node in the display interface. In addition, other nodes and edges linked to this node may also be highlighted. When developers/users are presented with the visualizations, they focus may be on the largest and/or most complex clusters in the entire graph. The visualization could optimize a developer's efficiency of mitigating vulnerability findings since prioritizing larger and/or more complex D-clusters first could fix more vulnerability findings at a time, thus optimizing efficiency, and when developers focus on mitigating one cluster of vulnerability findings, they may not be concerned with collisions with findings in other D-clusters.

The visualization in FIG. 1C includes various D-clusters. Each node in one D-cluster does not link to any other nodes in other D-clusters. Vulnerability findings in different D-clusters do not have any trace nodes in common. Therefore, they have different fix locations. Vulnerability findings in the same D-cluster do not necessarily share the same fix location. In fact, each D-cluster may contain several clusters. Collisions occur when one fix location is shared by two clusters. When developers/users are presented with this visualization, they should be able to identify the biggest and/or most complex cluster in the entire graph. The visualization could optimize developers' efficiency of mitigating vulnerability findings since prioritizing larger and/or more complex D-clusters first could fix more vulnerability findings at a time, thus improving efficiency.

A cluster is a set of findings that share an optimal fix location suggestion, such as large light colored circle. A D-cluster is a set of findings that share any kind of trace node. This could include multiple optimal fix location suggestions. A D-cluster can contain multiple clusters. The 'D' in 'D-cluster' refers to 'disjoint'. The set of trace nodes in a D-cluster is disjoint from the set of trace nodes in any other D-cluster. One use of D-clusters is that changes to any code represented by the trace nodes in one D-cluster have no effect on any trace nodes (or findings) in another D-cluster. A 'fix' for one type of vulnerability may interfere with a fix for another type of vulnerability. Having no interference between vulnerabilities simplifies the fix. The overall visualization is a collection of D-clusters. By permitting multiple clusters to be overlaid in a single D-cluster, the size of the overall visualization can be reduced and the duplication of findings and trace nodes is removed. Also, an 'edge' connects a finding and a trace node of the finding, which indicates that the trace node 'belongs to' the set of trace nodes of a finding. Edges are used when a developer may not want to use the optimal fix location suggestion, such as when there are multiple vulnerability types affected by that location. The edges permit other locations associated with the findings to be seen. Note the interactive use involves clicking on a finding and illuminating the nodes related to the finding and the illumination depends on the edges.

Figure 2A:
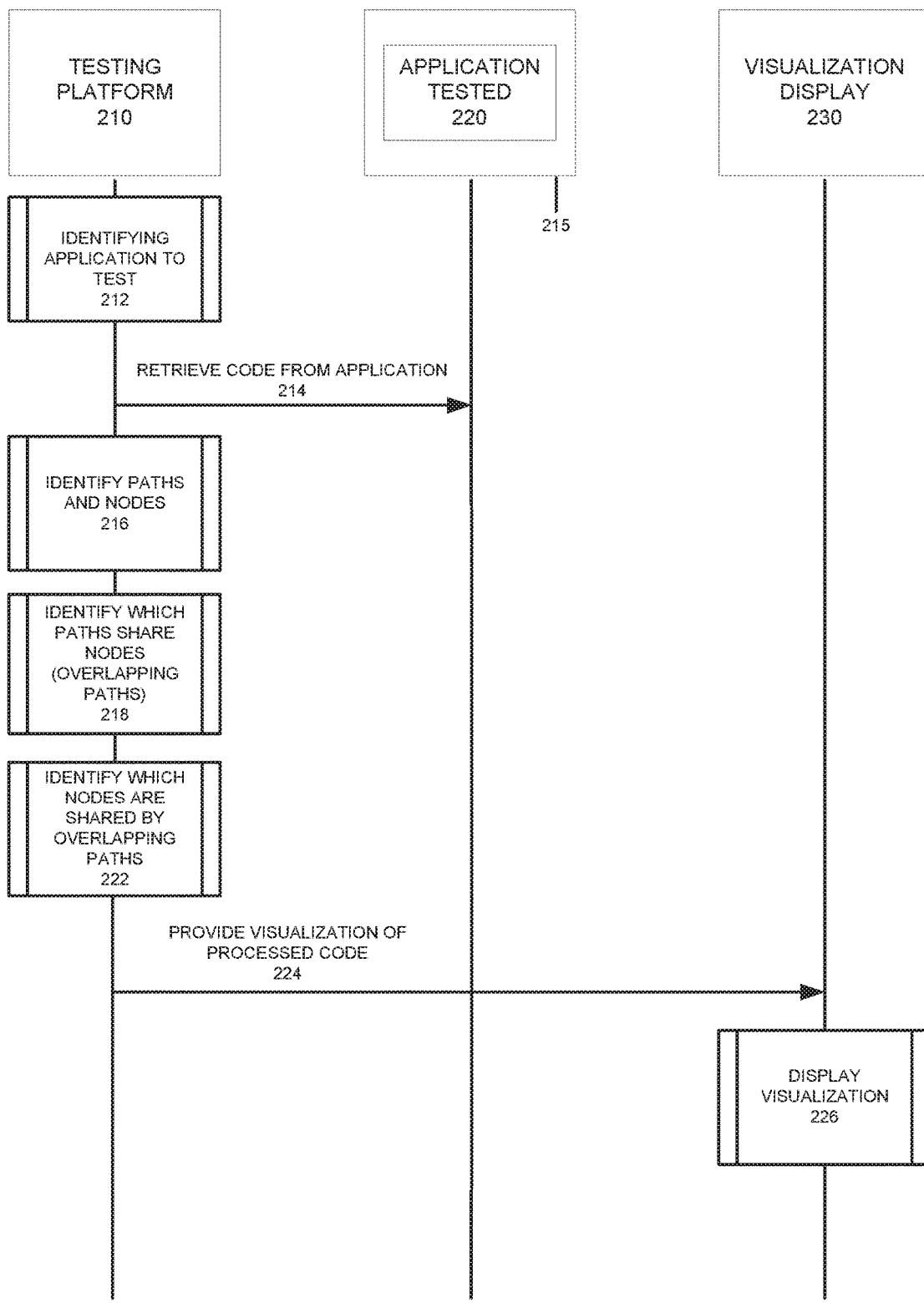
FIG. 2A illustrates an example system messaging diagram.

FIG. 2A illustrates an example system messaging diagram according to example embodiments. Referring to FIG. 2A, the system 200 may include a number of components, devices, or modules which may include software, hardware (including a processor and memory) or a combination of both. The components may include a first component, such as a testing platform 210, which may be a server, computer or other computational device that processes the software application being tested to extract various software entities necessary to visualize the application vulnerabilities. The application being tested 220 may be stored on a second component 215, which may be a server, computer or other computational device. A third component, such as a visualization display 230, may be any visualization device, such as a computer monitor or other display capable of displaying the visualization vulnerabilities.

In one embodiment, the first component, the second component and the third component may be separate devices such as servers, computers or other computational devices or may be a single device. In other embodiments, the first component and the second component may be enclosed as, or perform as, a single device, the first component and the third component may be enclosed as, or perform as, a single device, and the second component and the third component may be enclosed as, or perform as, a single device. The components or devices 210, 215 and 230 may be directly connected or communicably coupled to one another, in a wired or wireless manner, and may reside locally and/or remotely.

In one example, the application may be identified by a file name 212 or other identifier. The code may be retrieved 214 and set for processing to identify paths and nodes 216, which paths share nodes (overlapping paths) 218, and/or which nodes are shared by overlapping paths 222. The extracted entities and the relationships may then be used to form the basis of a visualization which is provided 224 to the display 230 to be displayed 226. The visualization and clusters may provide a way for identifying fix location suggestions, and optimal fix location suggestions. For example, the overlapping paths of 222 provide for identifying the commonly shared nodes and any special shared nodes which can be identified as fix location suggestions and optimal fix location suggestions. Such fix locations can be automatically identified based on characteristics of the fix locations, such as a minimum number of overlapping paths and/or shared nodes.

Figure 2B:
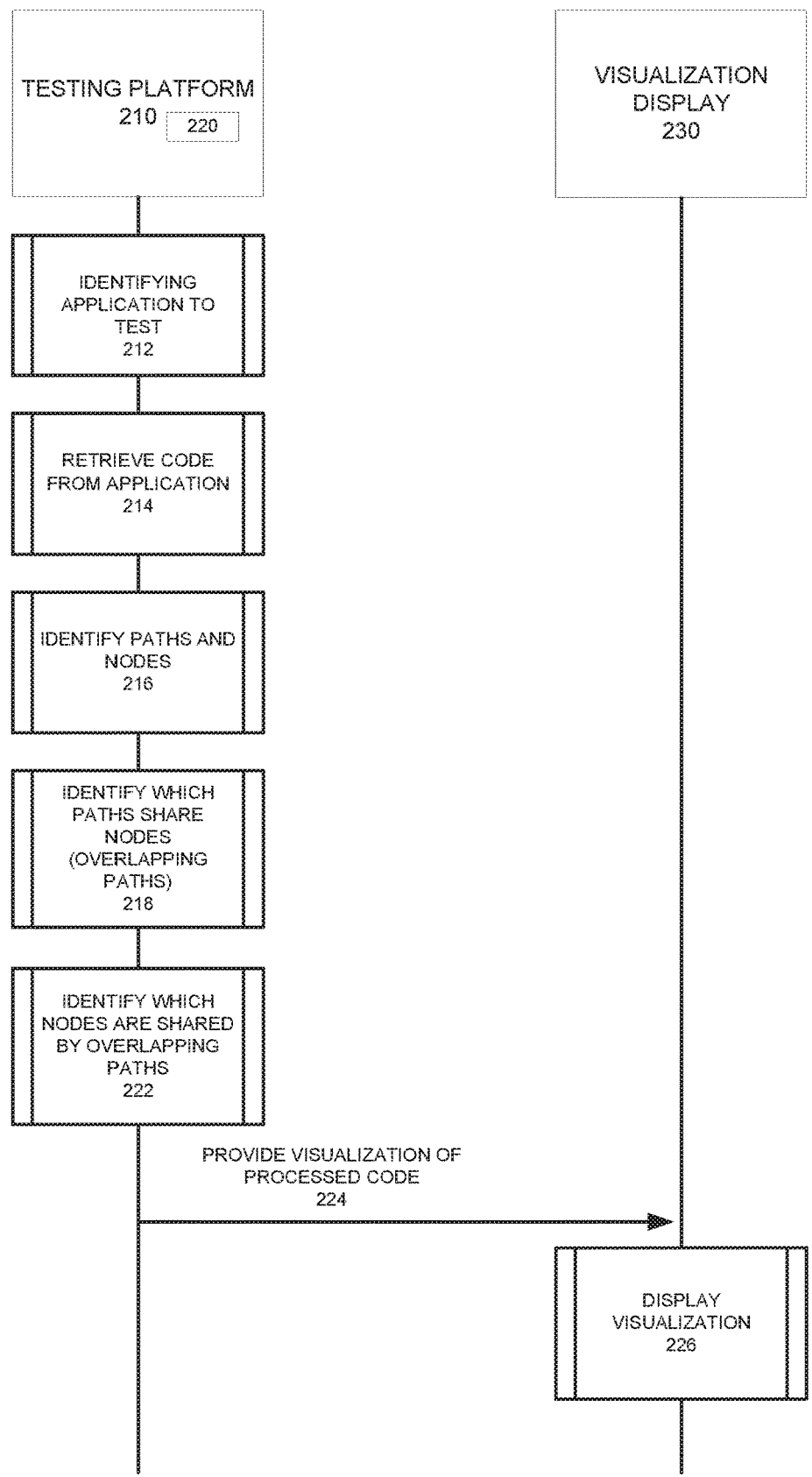
FIG. 2B illustrates another example system messaging diagram.

FIG. 2B illustrates an example system messaging diagram according to example embodiments. Referring to FIG. 2B, the system 200 may include a number of components or modules which may include software, hardware or a combination of both. The components may include a first component, such as a testing platform 210, which may be a server, computer or other computational device that processes the software application being tested to extract various software entities necessary to visualize the application vulnerabilities. The application being tested 220 may be stored on the testing platform 210. A second component, such as a visualization display 230, may be any visualization device, such as a computer monitor or other display capable of displaying the visualization vulnerabilities.

In one embodiment, the first component and the second component may be separate devices such as servers, computers or other computational devices or may be a single device. In other embodiments, the first component and the second component may be enclosed as, or perform as, a single device, the first component and the second component may be enclosed as, or perform as, a single device, and the second component may be enclosed as, or perform as, a single device. The components or devices 210, 220 and 230 may be directly connected or communicably coupled to one another, in a wired or wireless manner, and may reside locally and/or remotely.

In one example, the application may be identified by a file name 212 or other identifier. The code may be retrieved 214 and set for processing to identify paths and nodes 216, which paths share nodes (overlapping paths) 218, and/or which nodes are shared by overlapping paths 222. The extracted entities and the relationships may then be used to form the basis of a visualization which is provided 224 to the display 230 to be displayed 226. The visualization and clusters may provide a way for identifying fix location suggestions, and optimal fix location suggestions. For example, the overlapping paths of 222 provide for identifying the commonly shared nodes and any special shared nodes which can be identified as fix location suggestions and optimal fix location suggestions. Such fix locations can be automatically identified based on characteristics of the fix locations, such as a minimum number of overlapping paths and/or shared nodes.

Figure 3A:
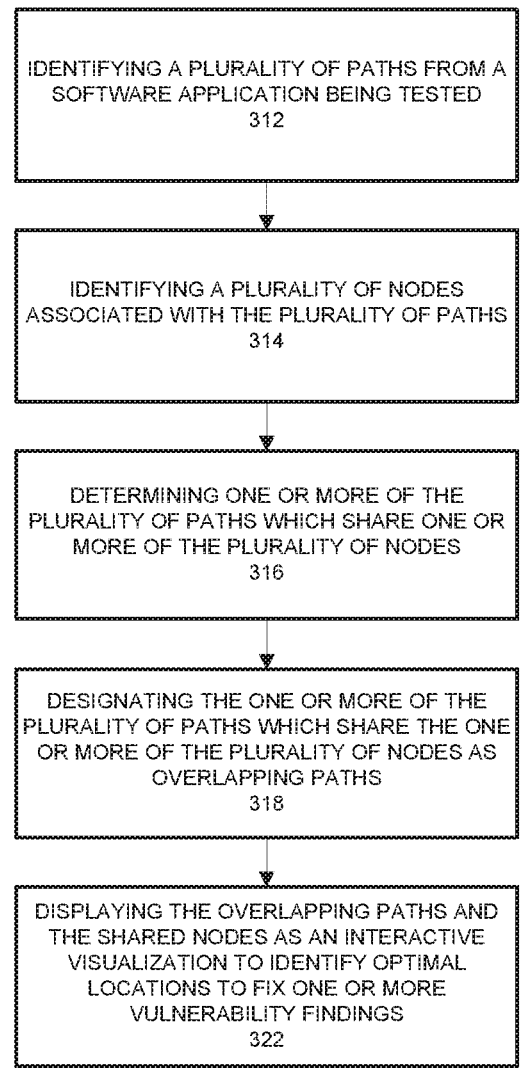
FIG. 3A illustrates an example logic flow diagram of an example method of detecting and displaying software vulnerabilities according to example embodiments.

FIG. 3A illustrates an example flow diagram 300 method of operation according to example embodiments. The method may include identifying a plurality of paths from a software application being tested 312, identifying a plurality of nodes associated with the plurality of paths 314, determining one or more of the plurality of paths which share one or more of the plurality of nodes 316, designating the one or more of the plurality of paths which share the one or more of the plurality of nodes as overlapping paths 318, and displaying the overlapping paths and the shared nodes as an interactive visualization 322 used to identify optimal locations to fix one or more vulnerability findings. In alternate embodiments, one or more of the steps can occur in a different order than depicted or can occur contemporaneously, or near-contemporaneously, with another step. Each of the paths are associated with a corresponding potential vulnerability finding. Displaying the overlapping paths may include displaying a bipartite graph with a cluster of the overlapping paths. The cluster includes a plurality of vulnerability findings each sharing a same fix location. The bipartite graph includes shared nodes shared by two or more individual traces and further includes condensed trace nodes which includes two or more unshared nodes. The method may include identifying a fix location that is shared by two or more clusters, and identifying a collision occurrence in the interactive visualization at the fix location. Each of the plurality of nodes may include a vulnerability finding type node or a trace type node. A 'finding' is a path through the code that, if taken at execution time, would create a vulnerability in the application. Each of the paths is associated with a single finding. That is, there is a 1-1 mapping between paths and findings. The 'paths' refer to paths through the program at execution time. Because execution can branch and loop it can be represented as a graph. 'Paths' refers to paths in that graph. The term 'traces' may also be used synonymously.

Figure 3B:
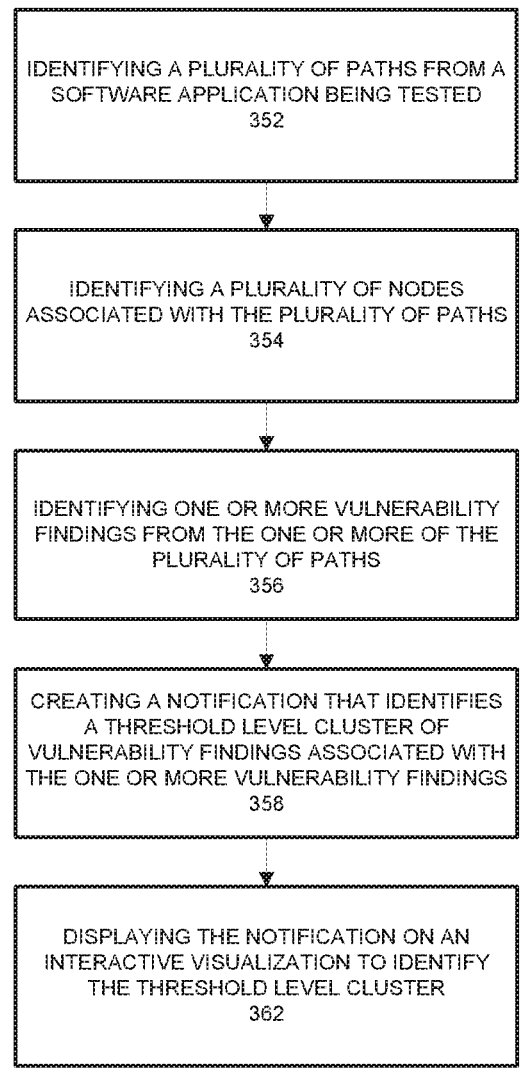
FIG. 3B illustrates an example logic flow diagram of another example method of detecting and displaying software vulnerabilities according to example embodiments.

FIG. 3B illustrates another flow diagram 350 according to another example embodiment. Referring to FIG. 3B, the method may include identifying a plurality of paths from a software application being tested 352, identifying a plurality of nodes associated with the plurality of paths 354, identifying optimal locations to fix one or more vulnerability findings from the plurality of paths 356, creating a notification that identifies a threshold level cluster of vulnerability findings associated with the one or more vulnerability findings 358, and displaying the notification on an interactive visualization to identify the threshold level cluster 362. In alternate embodiments, one or more of the steps can occur in a different order than depicted or can occur contemporaneously, or near-contemporaneously, with another step. In this embodiment, the clusters or density displays of potential vulnerability findings are identified by a threshold level audit such that, for example, a certain number of vulnerabilities per a given path or intersection of paths may yield in excess of a predetermined threshold. As a result, the notification may be created to present a notification to the display interface of the particular instances of nodes and paths of an excessive amount of vulnerability findings. This enables the user to receive updates, or specific notifications regarding areas of concern in the software code. Especially those which are above the threshold limit of concern and which should be identified and corrected.

Figure 4:
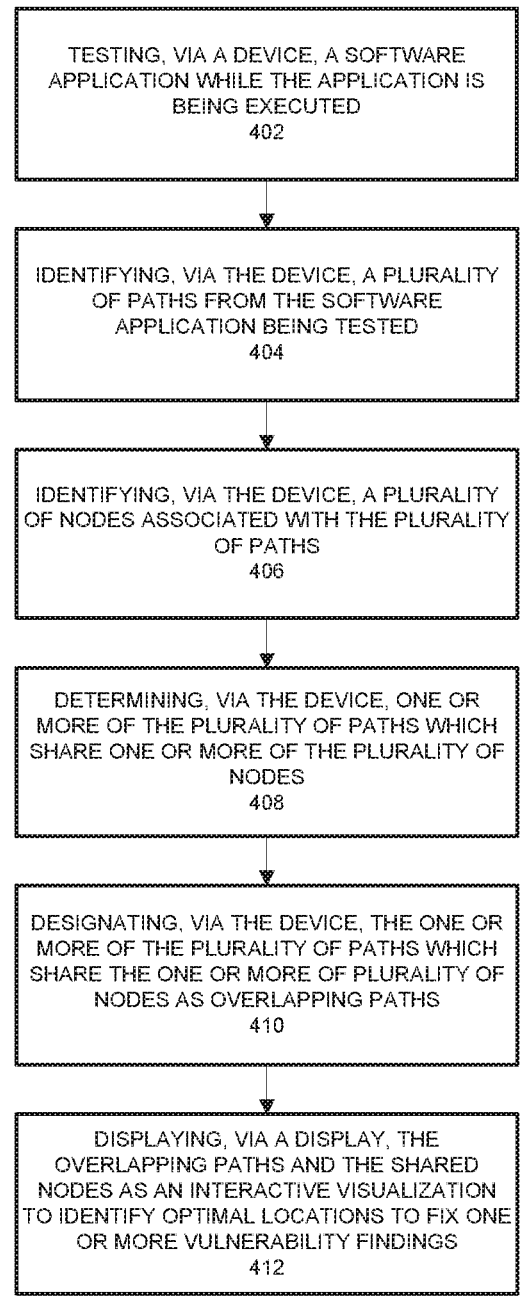
FIG. 4 illustrates another example logic flow diagram of another example method of detecting and displaying software vulnerabilities according to example embodiments.

FIG. 4 illustrates another flow diagram 400 according to another example embodiment. Referring to FIG. 4, the method may include testing, via a device, a software application while the application is being executed 402, identifying, via the device, a plurality of paths from the software application being tested 404, identifying, via the device, a plurality of nodes associated with the plurality of paths 406, determining, via the device, one or more of the plurality of paths which share one or more of the plurality of nodes 408, designating, via the device, the one or more of the plurality of paths which share the one or more of the plurality of nodes as overlapping paths 410, and displaying, via a display, the overlapping paths and the shared nodes as an interactive visualization to identify optimal locations to fix one or more vulnerability findings 412. In alternate embodiments, one or more of the steps can occur in a different order than depicted or can occur contemporaneously, or near-contemporaneously, with another step. In this embodiment, the clusters or density displays of potential vulnerability findings are identified by a threshold level audit such that, for example, a certain number of vulnerabilities per a given path or intersection of paths may yield in excess of a predetermined threshold. As a result, the notification may be created to present a notification to the display interface of the particular instances of nodes and paths of an excessive amount of vulnerability findings. This enables the user to receive updates, or specific notifications regarding areas of concern in the software code. Especially those which are above the threshold limit of concern and which should be identified and corrected.

Example embodiments may be a system, a method, and/or a computer program product at any possible technical detail level of integration. The computer program product may include a non-transitory computer readable storage medium (or media) having computer readable program instructions thereon for causing a processor to carry out aspects of the embodiments.

The non-transitory computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
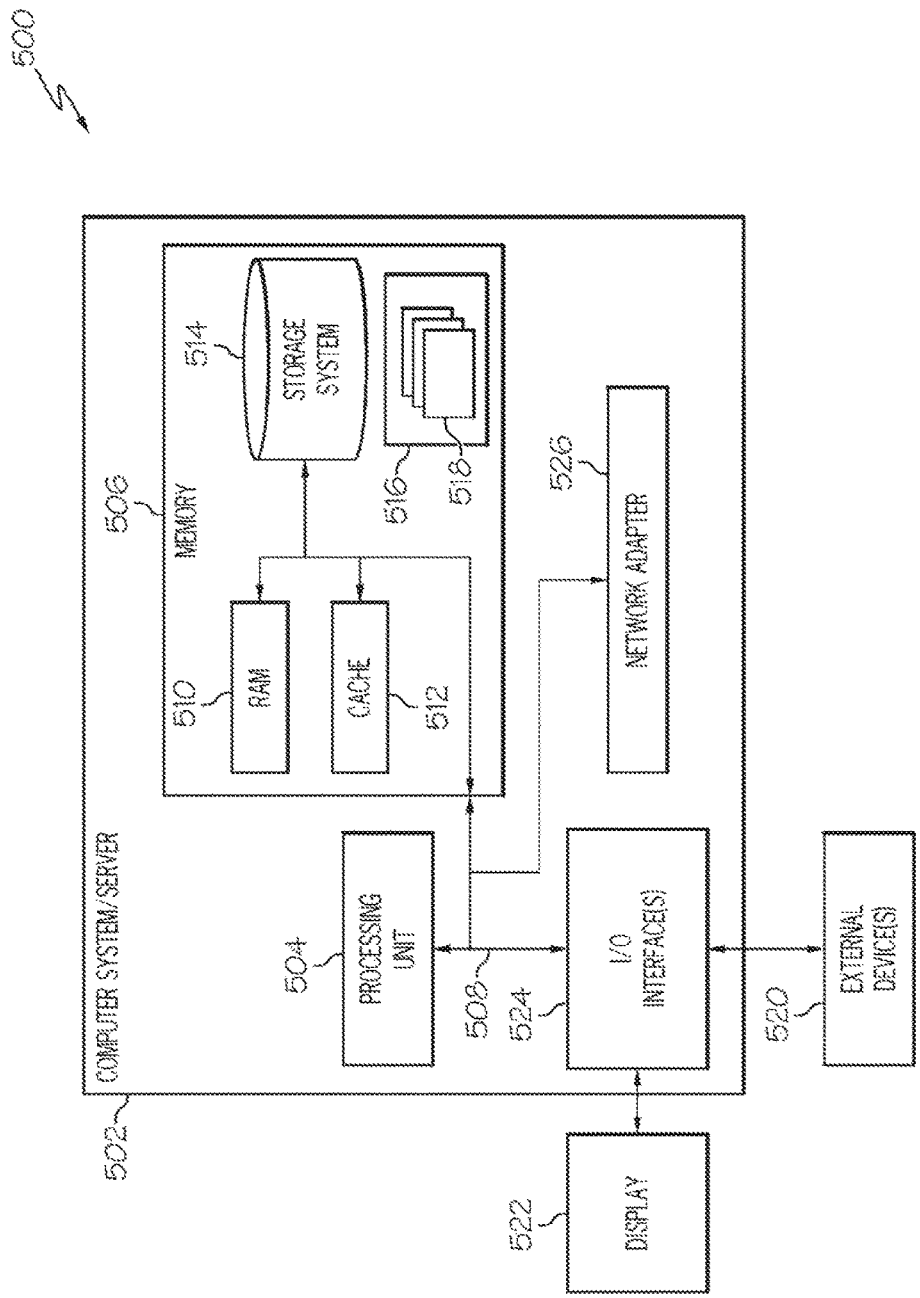
FIG. 5 illustrates one example of a computing node to support one or more of the example embodiments.

FIG. 5 illustrates one example of a computing node 500 to support one or more of the example embodiments. This is not intended to suggest any limitation as to the scope of use or functionality of embodiments of the invention described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus 508 that couples various system components including system memory 506 to processor 504.

Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and nonvolatile media, removable and non-removable media.

System memory 506, in one embodiment, implements the flow diagrams of FIGS. 3-4. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CDROM, DVD-ROM or other optical media can be provided. In such instances, each can be connected to bus 508 by one or more data media interfaces. As will be further depicted and described below, memory 506 may include at least one program product having a set (e.g., at least one) of program modules that are configured to carry out the functions of various embodiments of the invention.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via bus 508. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

In general, the routines executed to implement the embodiments of the invention, whether implemented as part of an operating system or a specific application; component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described herein may be identified based upon the application or software component within which it is implemented in specific embodiments of the invention. However, it should be appreciated that any particular program nomenclature used herein is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 5 is not intended to limit the present invention. Indeed, those skilled in the art will recognize that other alternative hardware and/or software environments may be used without departing from the scope of the invention.

While all of the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art, such as applying this technique to existing network security systems. The invention in its broader aspects is therefore not limited to the specific details, representative apparatus and method, and illustrative examples shown and described. Accordingly, departures may be made from such details without departing from the spirit or scope of the applicant's general inventive concept.

What is claimed is:

1. A method comprising:
    testing, via a device, a software application while the application is being executed;
    identifying, via the device, paths of traces of vulnerabilities found in the software application while the software application is being tested;
    identifying, via the device, nodes located on the paths;
    determining, via the device, that at least two vulnerability findings have overlapping paths in response to traces of the at least two vulnerability findings sharing one or more nodes; and
    displaying, via a display, the overlapping paths of the traces of the at least two vulnerability findings as an interactive visualization to identify optimal locations to fix one or more vulnerability findings.

2. The method of claim 1, wherein each trace is associated with a corresponding potential vulnerability finding.

3. The method of claim 1, wherein displaying the overlapping paths comprises displaying a bipartite graph with a cluster of the overlapping paths, and wherein the cluster comprises a plurality of vulnerability findings each sharing a same fix location.

4. The method of claim 3, further comprising:
    identifying a fix location that is shared by two or more clusters; and
    identifying a collision occurrence in the interactive visualization at the fix location.

5. The method of claim 1, wherein the bipartite graph comprises only nodes which are shared by the at least two vulnerability findings.

6. The method of claim 1, wherein each node includes a vulnerability finding type node or a trace type node.

7. The method of claim 1, further comprising:
    performing one or more of removing, nullifying, and modifying the optimal locations to fix the one or more vulnerability findings.

8. An apparatus, comprising:
    a processor configured to:
        test a software application while the application is being executed;
        identify paths of traces of vulnerabilities found in the software application while the software application is being tested;
        identify nodes located on the paths; and
        determine that at least two vulnerability findings have overlapping paths in response to traces of the at least two vulnerability findings sharing one or more nodes; and
    a display configured to display the overlapping paths of the traces of the at least two vulnerability findings as an interactive visualization to identify optimal locations to fix one or more vulnerability findings.

9. The apparatus of claim 8, wherein each trace is associated with a corresponding potential vulnerability finding.

10. The apparatus of claim 8, wherein displaying the overlapping paths comprises displaying a bipartite graph with a cluster of the overlapping paths.

11. The apparatus of claim 8, wherein the bipartite graph comprises only nodes which are shared by the at least two vulnerability findings.

12. The apparatus of claim 11, wherein the processor is further configured to:
    identify a fix location that is shared by two or more clusters; and
    identify a collision occurrence in the interactive visualization at the fix location.

13. The apparatus of claim 8, wherein each node includes a vulnerability finding type node or a trace type node.

14. The apparatus of claim 8, wherein the processor is further configured to perform one or more of removing, nullifying, and modifying the optimal locations to fix the one or more vulnerability findings.

15. A non-transitory computer readable storage medium configured to store instructions that when executed cause a processor to perform:
    testing, via a device, a software application while the application is being executed;
    identifying, via the device, paths of traces of vulnerabilities found in the software application while the software application is being tested
    identifying nodes located on the paths;
    determining that at least two vulnerability findings have overlapping paths in response to traces of the at least two vulnerability findings sharing one or more nodes;
    displaying the overlapping paths of the traces of the at least two vulnerability findings as an interactive visualization to identify optimal locations to fix one or more vulnerability findings.

16. The non-transitory computer readable storage medium of claim 15, wherein each is associated with a corresponding potential vulnerability finding.

17. The non-transitory computer readable storage medium of claim 15, wherein displaying the overlapping paths comprises displaying a bipartite graph with a cluster of the overlapping paths.

18. The non-transitory computer readable storage medium of claim 17, wherein the processor is further configured to perform:
   identifying a fix location that is shared by two or more clusters; and
   identifying a collision occurrence in the interactive visualization at the fix location, wherein each node includes a vulnerability finding type node or a trace type node.

19. The non-transitory computer readable storage medium of claim 15, wherein the bipartite graph comprises only nodes which are shared by the at least two vulnerability findings.

20. The non-transitory computer readable storage medium of claim 15, wherein the processor is further configured to perform:
   performing one or more of removing, nullifying, and modifying the optimal locations to fix the one or more vulnerability findings.

* * * * *